Sept. 1, 1970   L. L. KILPATRICK   3,526,484
POLYMER FINISHING APPARATUS
Filed May 17, 1968   3 Sheets-Sheet 1

INVENTOR
LESTER LOUIS KILPATRICK

BY *Norris E. Ruckman*
ATTORNEY

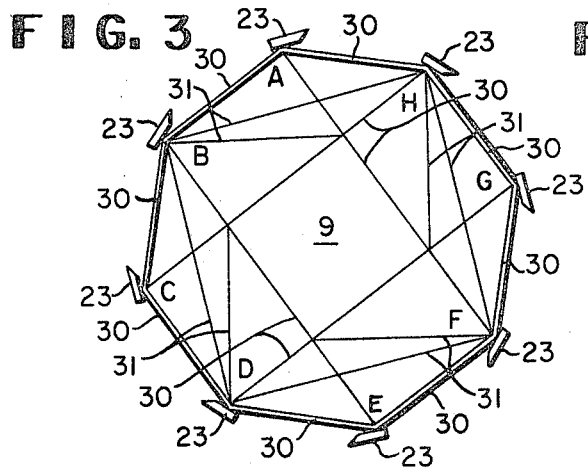
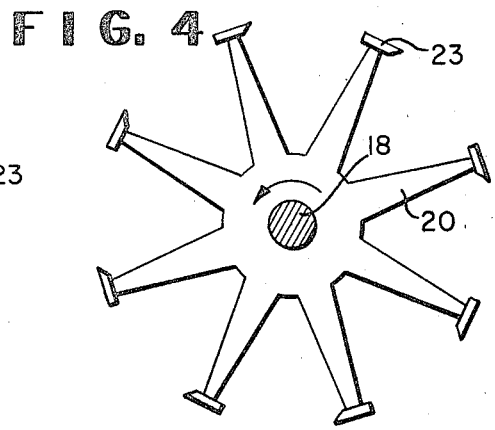
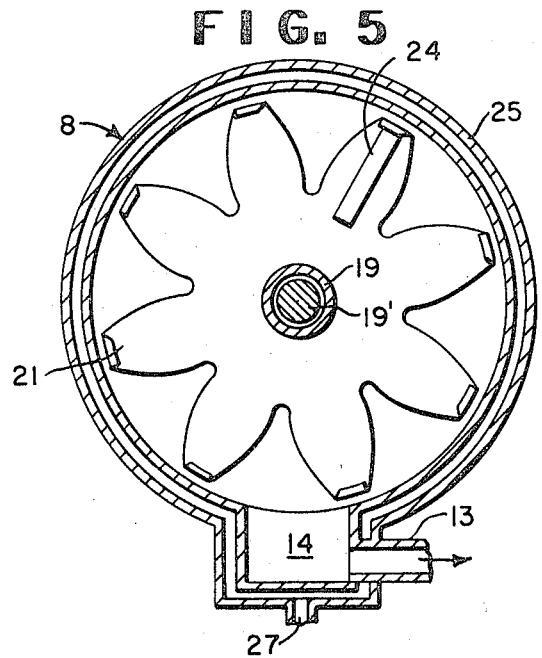
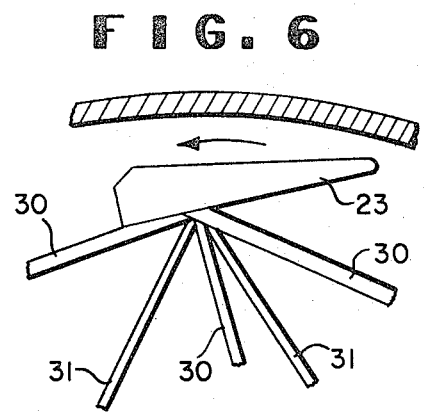
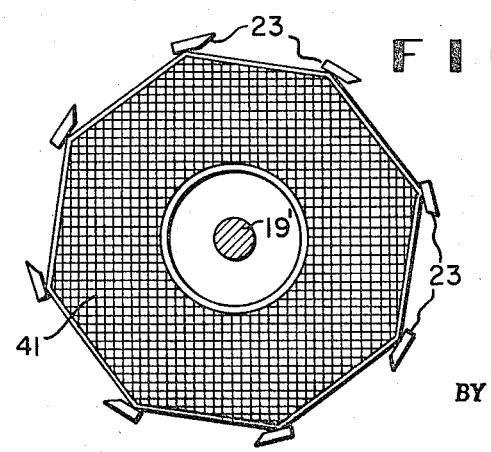

INVENTOR
LESTER LOUIS KILPATRICK

United States Patent Office 3,526,484
Patented Sept. 1, 1970

3,526,484
POLYMER FINISHING APPARATUS
Lester Louis Kilpatrick, Grifton, N.C., assignor to E. I. du Pont de Nemours and Company, Wilmington, Del., a corporation of Delaware
Filed May 17, 1968, Ser. No. 730,046
Int. Cl. B01j 1/00
U.S. Cl. 23—285                                                    1 Claim

ABSTRACT OF THE DISCLOSURE

Apparatus for removing volatile material from viscous liquid, as in polycondensation reactions for producing polyesters and polyamides. Liquid is fed into one end of a cylindrical vessel, is picked up on rotating screens or film-supporting wires which are wiped by rigid blades to form liquid films of greatly increased area, volatile material is evaporated and removed from the vessel, the liquid progresses along the vessel, being picked up by subsequent screens or wires for further removal of volatile material, and the product is removed from the opposite end of the vessel. Temperature and pressure are readily controlled to provide desired evaporation and reaction conditions.

BACKGROUND OF THE INVENTION

This invention relates to an apparatus for converting a viscous liquid into a liquid of higher viscosity by removal of a volatile material, being particularly adapted for polycondensation reactions in which volatile material is removed and a polymeric material of high viscosity is produced which remains in a liquid state at the temperature prevailing during the reaction.

The commercial preparation of most linear condensation polymers, such as polyesters or polyamides, involves heating monomeric starting materials to cause progressive condensation with loss of low molecular weight volatile material until the desired molecular weight level is achieved. In a typical example, poly(ethylene terephthalate) is formed from bis-2-hydroxyethyleneterephthalate by heating the starting material at proper temperatures, generally at increasingly lower pressures, with evolution of ethylene glycol until the desired fiber or film-forming viscosity is achieved. The process is usually carried out in two or more stages with intermediate formation of a low molecular weight, low viscosity polymeric liquid which is then passed through vessels maintained at proper temperatures and low partial pressures. Vessels of this type are customarily known as "polymer finishers."

The problems associated with the proper design of polymer finishers have long been recognized and described in the prior art. Finishers such as those described by Willey U.S. Pat. No. 3,046,099, dated July 24, 1962, and Pierce et al. U.S. Pat. No. 3,057,702 dated Oct. 9, 1962, have been shown to function satisfactorily to produce polymer with uniform viscosity in the normal range required for the then known polymeric yarns. However, as the need grew for improved yarns with better color and higher tenacities, it was necessary to either increase the throughput or the viscosity of the polymer from the finisher to such a point that it was impossible to generate sufficient surface in the highly viscous material to accomplish the desired polymerization rate. The screens and flights described by the prior art require wide spacing to prevent polymer from bridging the space between them. For high viscosity polymer, the increased spacing would require the polymer finisher to be excessively large and impractical. For higher quality polymer, which results at high throughput, insufficient surface area is generated with prior art devices.

It is, therefore, an object of this invention to provide an improved polymer finisher apparatus which is particularly useful for preparing high viscosity polymer of exceptional quality.

SUMMARY OF THE INVENTION

This invention is, in apparatus having a generally cylindrical polymerization vessel with an inlet for liquid near one end, an outlet for liquid near the other end and an outlet for removing volatile material, and having a plurality of closely-spaced screens or other film-supporting means rotatably mounted perpendicular to the axis of said vessel which upon rotation expose polymer to an evaporative milieu, the improvement of an axially rotatable shaft aligned parallel to the longitudinal axis of said vessel and running through the planes of said evaporative members and having a plurality of rigid wiper blades which extend between at least two adjacent evaporative members and move relative to the evaporative members, the assembly being such that upon rotation of the evaporative members and their consequent take-up of polymer for exposure to the evaporative milieu, the wipers expose polymer on the faces of adjacent evaporative members.

In the drawings which illustrate preferred embodiments of the apparatus,

FIG. 1 is a longitudinal axial section of a cylindrical polymerization vessel with the cylindrical cage shown in elevation and with the film-supporting members and wiper blades removed for clarity;

FIG. 2 is the same view with the helical rods 22 of FIG. 1 and all but two of the peripheral bars 23 removed, and including film-supporting members 41, wiper blades 40 and end wiper blade 42;

FIG. 3 is a typical transverse section of the cylindrical cage taken on line 3—3 of FIG. 1 and including film-supporting wires;

FIG. 4 is a transverse section taken on line 4—4 of FIG. 1 to show the end wheel nearest the inlet end of the vessel;

FIG. 5 is a transverse section of the cylindrical polymerization vessel taken at line 5—5 of FIG. 1;

FIG. 6 is a detailed enlargement of a portion of the cage and film-supporting members;

FIG. 7 is a transverse section of the cylindrical cage, taken on line 7—7 of FIG. 2, showing a film-supporting screen 41;

Figure 1:
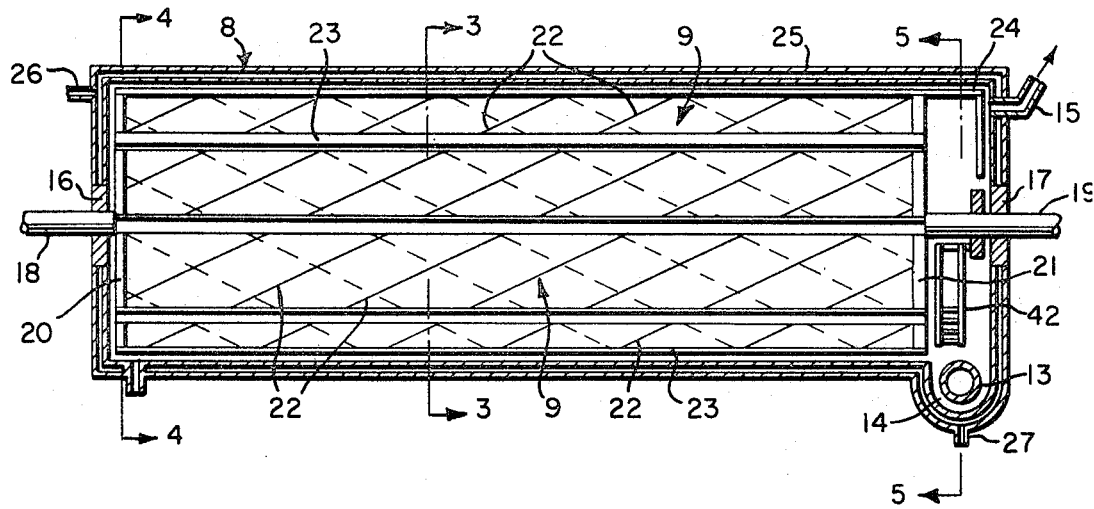

FIG. 1 is a view of the new apparatus with vertical film-supporting means, wiper blades and associated shaft removed for clarity, with one-half of the polymerization vessel 8 cut away to show cage 9 mounted within it, as seen in side elevation. Vessel 8 has inlet 12 near one end to receive liquid and outlet 13 communicating with well 14 of the vessel near the other end to discharge liquid. Vent 15 for discharging vapor is located in the upper portion of the vessel at the discharge end. If desired, a vent may be provided at the inlet end or at both ends. At opposite ends of the vessel, journals 16 and 17 rotatably support and seal shafts 18 and 19 which extend axially from spoked or otherwise perforated end wheels 20 and 21 of the cage 9. The shafts are rotated and sealed by suitable means (not shown) outside the vessel.

Preferably, the cage 9, as shown in FIG. 1, includes helical rods 22 arranged as chords progressing from the inlet end to the outlet end of the vessel to give the structure added strength. These helical rods are mounted within and are supported by a number of peripheral bars 23 extending between and mounted upon the end wheels 20 and 21. Blade 24, affixed to end wheel 21 at the outlet end of the vessel, has a height equal to a radius which clears shaft 19. Vessel 8 is surrounded by jacket 25 provided with suitable inlet and outlet vents 26 and 27 for the circulation of vapor or other fluid means for maintaining the desired temperature. Heat is usually supplied to the vessel, although removal of heat may be necessary in some instances.

Figure 2:
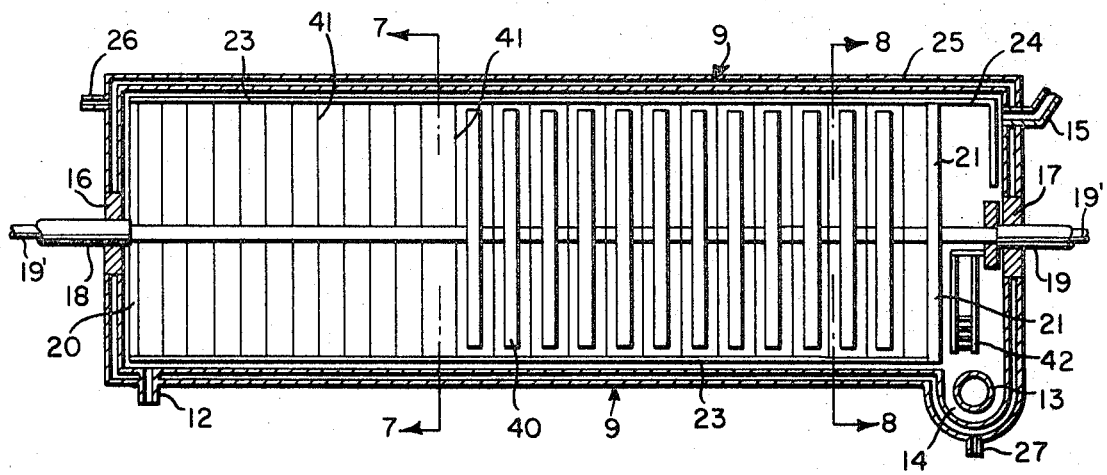

FIG. 2 is the same view of the new apparatus with the helical rods 22 and all but the top and bottom peripheral bars 23 removed for clarity, and including the film-supporting means 41, wiper blades 40 and their associated central shaft. Shaft 19' is rotated and sealed against leakage by suitable outside means (not shown). Film-supporting members 41 are rigidly mounted at points on their periphery to rods 23, two of which are shown in this figure. The film-supporting means, such as the screen 41 shown in FIG. 7, have central openings for accommodating shaft 19' which extends perpendicularly through their planes; thus as shafts 18 and 19 are rotated, bars 23 revolve about shaft 19' and carry the screens with them. At the polymer entry part of the vessel, screens 41 are preferably spaced closer together and may be of finer mesh than those at the polymer exit portion of the vessel, to allow for efficient handling of the progressively higher viscosity polymer from entrance to exit. Wiper blades 40 are rigidly mounted to shaft 19' and rotate therewith in either the same or, what is preferable, in an opposite direction to the direction of rotation of screens 41. Although FIG. 2 shows the wiper blades lined up, it is sometimes preferable to have them staggered or in other special relationships to each other.

FIG. 3 illustrates a transverse section of a portion of the cylindrical cage 9 which shows another type of film-supporting means affixed to the peripheral bars 23. This film-supporting means comprises twelve wires 30 in the plane of the paper extended between points of bars 23, connecting points AF, BE, CH, DG, and AH, HG, GF, FE, ED, DC, CB, BA, and additional film-supporting wires 31, shown extending to intersections. Additional film-supporting wires (not shown) are desirable in the region of lower viscosity near the inlet end of the vessel.

FIG. 4 illustrates, in a corresponding view, the end wheel 20 forming the connection between shaft 18 and peripheral bars 23 at the inlet end of the vessel. The spokes of the wheel are preferably placed in close proximity to the interior end of the vessel to function as scrapers or wipers to continually move or wipe the material being processed at the end surface of the vessel.

FIG. 5 is a transverse section of the vessel and cage mounted within it, taken at the line 5—5 of FIG. 1 at the outlet end of the vessel, showing perforated end wheel 21 and blade 24. FIG. 5 also shows the well 14 in the lower part of the vessel from which finished polymer is drawn off through outlet 13. Removal of the product may be facilitated by use of an exhaust pump (not shown) in the well and outlet line.

FIG. 6 is an enlargement of a typical welded connection between peripheral bar 23 and wires 30 and 31. FIG. 6 also shows a preferred taper of bar 23 whose outer and inner sides define an included angle of between about 5° and 25°.

In the apparatus embodiments shown in the figures, end wheel 20 serves to wipe the inlet end of the vessel in a manner similar to the wiping of the cylindrical wall by the peripheral bars 23. At the outlet end, end wheel 21 is spaced away from the vessel wall to facilitate passage of vapors into the vent 15 while blade 24 serves to wipe the wall. If desired, the blade may be omitted and the outlet wall may also be wiped by the end wheel. In such a case, the perforations in the end wheel and the outlet vent are suitably shaped and spaced so that a continuous open passage is provided for vapor removal as the cage 9 rotates. Of course, if a vent is provided at the inlet end or at each end of the vessel, the apparatus will be adapted for vapor removal and wiping action.

Figure 8:
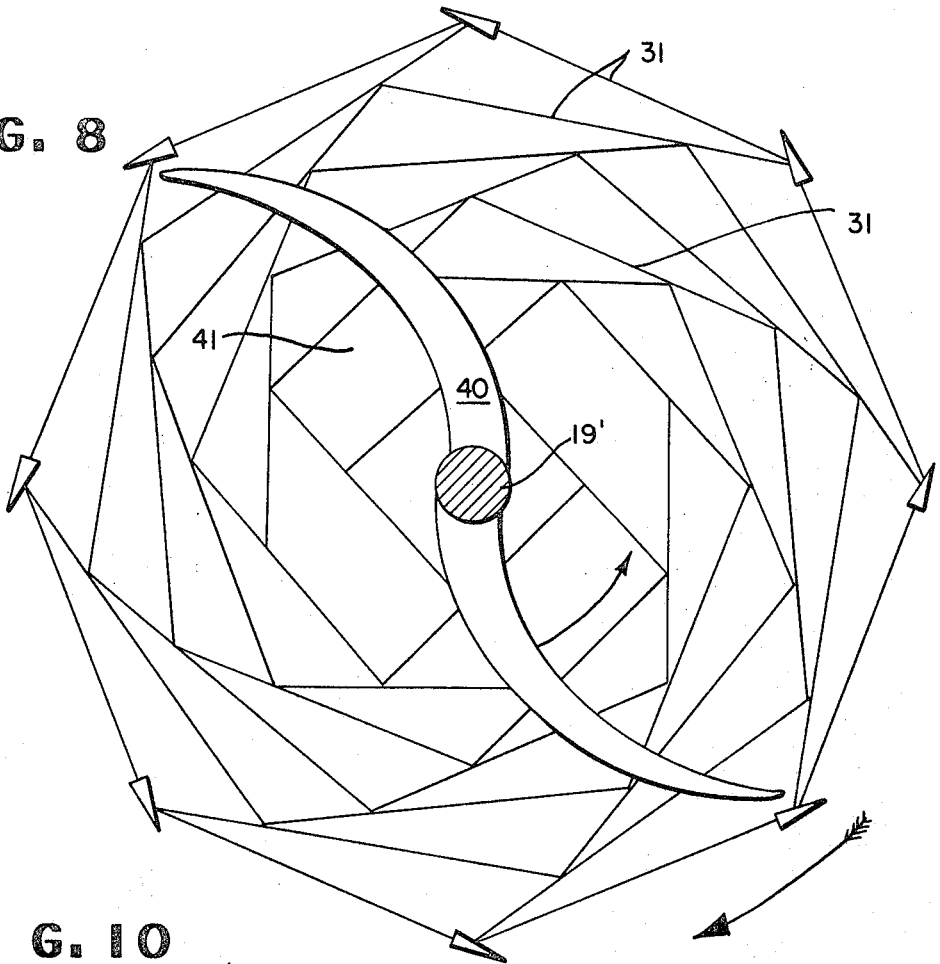
FIG. 8 is a transverse section of the cylindrical cage, taken on line 8—8 of FIG. 2, and showing another film-supporting means and a wiper blade.

The film-supporting means 41 may be ordinary woven wire screens such as the one shown in FIG. 7, or they may comprise a group of wires in a spacial pattern similar to that shown in FIG. 3 or 8. The latter design has the particular advantage of being relatively immune from warping. Perusal of FIG. 8 will show that if any of the inside wires stretches, the other wires connected thereto will move to compensate for the elongation and, in so doing, will eliminate the tendency of the member to warp.

The wiper blades 40 may be of various sizes and shapes. They may be of straight configuration or, preferably, may be S-shaped as shown in FIG. 8, or they may even be C-shaped and extend in only one direction. They are made of rigid material, such as steel, and preferably extend to points close to peripheral bars 23. They may be stationary or may rotate in the same or in a different direction from the adjacent film-supporting members. They may be in line or staggered in orientation in the vessel. The in-line arrangement is shown in FIG. 2. Preferably, the wiper blade contains one or more elongated slots running from leading to trailing edge to allow polymer to pass through and reduce stagnant areas in the vicinity of the trailing edge. If the blade is S-shaped, it preferably rotates in the direction of the inner arrow shown in FIG. 8, and the associated film-supporting means preferably rotates in the direction of the outer arrow of FIG. 8.

Figure 10:
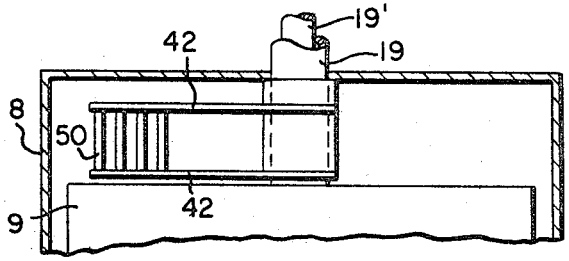
FIG. 10 is a plan view of one end of the new vessel partially in section and cut away to show the wiper blade of FIG. 9 installed in the vessel.
Figure 9:
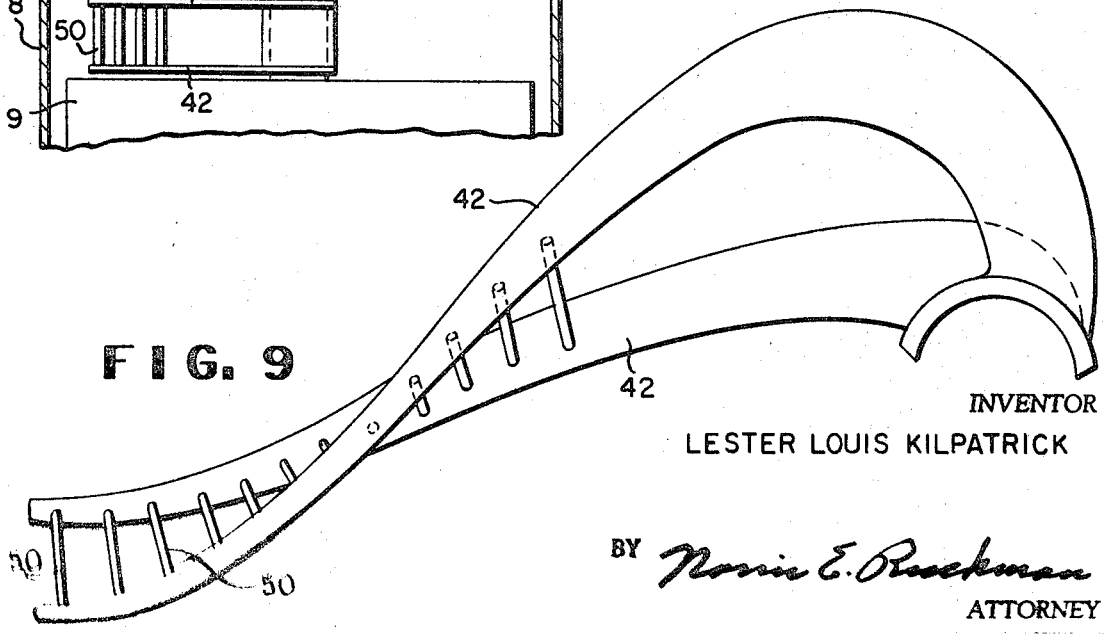
FIG. 9 is a perspective view of an end wiper blade 42 useful for an embodiment of the present invention.

Another type of wiper blade design suitable particularly for the end of the vessel where polymer is fed to a screw pump or the like is shown in FIGS. 9 and 10. Here, two extending blades 42 are shown connected by bars 50. The overall effect of the design is to push polymer downward to the pump inlet 14.

Operation of the finisher is described with the aid of the drawings as follows:

Liquid polymer of relatively low viscosity is forced by suitable means into the inlet of the vessel and progresses to the other end and out the outlet. As the cage turns, the film-supporting means 41 revolve and are wiped by blades 40 to carry a film of liquid polymer which greatly increases the exposed polymer surface area. In combination with an evaporative milieu, this facilitates rapid polymerization and simultaneous vaporization of vapor byproduct. The vapor flows between the cage and vessel through the open area, through the openings in wheel 21, and out of the vessel through vent 15. The vessel is usually maintained at low vapor partial pressure by employing suitable vacuum-producing means (not shown).

As the film-supporting members revolve and expose polymer to the evaporative atmosphere, a portion or all of them are wiped by wiper blades 40, mounted on shaft 19' as in FIG. 2. This prevents bridging of high viscosity polymer between adjacent films so that screens or other film-supporting means can be placed closer together than in the prior-art-type finishers. Closely-spaced screens with no bridging therebetween provide for very high polymer surface area in a relatively small space. The polymer surface area generated by the action of the new wiper blades on the closely-spaced film-supporting members is several times greater than in prior art finishers. It was found that, within reasonable limits, cage speed and polymer viscosity do not affect the surface area generated. In the new finisher, very high viscosity polymer can be made in relatively small vessels with a resultant improvement in quality and, what is equally significant, super-viscosity material can be made in normal-sized vessels. In addition to the function of preventing bridging of polymer between adjacent films, the new wiper blades greatly improve passage of polymer from inlet to outlet of the vessel. It was unexpectedly found that, unlike prior art finishers wherein screw flights, tilted vessel or deep bottom pools are necessary to provide for flow of polymer through the vessel, the bottom pool in the new apparatus is nearly nonexistent and is not needed to provide polymer flow.

An unexpected and very important feature of the new apparatus is that the volume of polymer in the vessel is nearly independent of melt viscosity. This facilitates control of viscosity of the polymer exiting from the vessel.

Another advantage of this apparatus over prior art proposals is in the ease of fabrication and cleaning of the vessel. The prior-art-type stationary wipers, mounted on the stationary shell of the vessel, are not only extremely difficult to install in the proper spaces between the film-supporting members, but create areas for polymer to accumulate, stagnate and degrade. The new apparatus also provides a freedom of motion of the wipers relative to both the film-forming means and the shell, as desired.

In practice, the dimensions of the vessel and the cage, the number and spacing of the film-supporting members, and the cage speed will depend upon the throughput of the liquid being processed. The following ranges of size have been found desirable for a vessel constructed to hold a 6 to 96-inch (15 to 240-cm.) diameter cage and utilized for the polycondensation of poly(ethylene terephthalate) having an inlet degree of polymerization within the viscosity range of 10 to 300,000 poises: Depending on the viscosity of the liquid to be processed, $1/16$ to 1 inch (1.59 to 25.4 mm.) radial clearance and $1/16$ to 3 inches (1.59 to 76 mm.) end clearance is preferred. The peripheral bars are $1/2$ to 6 inches (12.7 to 152 mm.) wide, preferably tapering in cross section from about $1/8$ to $1 1/2$ inches (3.18 to 38 mm.) to about $1/32$ to $1/4$ inch (.8 to 6.4 mm.) and long enough to attach to the end wheels 20 and 21. The helical rods 22 are fabricated from stock large enough to carry the structural load. Film-supporting wires are preferably $1/16$ inch (1.59 mm) to $3/16$ inch (4.75 mm.) in diameter and arranged in the configuration shown in FIG. 8. The wiper blades are preferably S-shaped and about $1/4$ to 3 inches (6.35 to 76 mm.) wide near the center and extend within $1/16$ to 1 inch (1.59 to 25.4 mm.) from the inner surface of the peripheral bars. They are approximately $1/4$ to $1 1/2$ inches (6.4 to 38 mm.) thick and are approximately $1/2$ to 3 inches (12.7 to 76 mm.) from their adjacent film-supporting members.

While the apparatus has been described for the processing of poly(ethylene terephthalate), the apparatus is also readily adaptable to the processing of other linear condensation polymers, such as poly(hexamethylene adipamide). The invention can also be employed in the evaporation of dilute solutions of viscous liquids to remove part, or all, of the solvent from the liquid, being especially useful in the processing of high-viscosity liquids which are prone to degradation when heated for prolonged periods of time.

I claim:

1. An improved polymer-finishing apparatus of the type having a generally cylindrical polymerization vessel with an inlet for liquid near one end, an outlet for liquid near the other end and an outlet for removal of volatile material, and a cylindrical-cage agitator inside the vessel which is mounted for rotation about the longitudinal axis of the vessel and includes a plurality of film-supporting members for exposing polymer to evaporative milieu in the form of facing films having planes perpendicular to the axis of rotation of the agitator; wherein the improvement comprises an axially rotatable shaft aligned parallel to the longitudinal axis of the vessel and extending through the planes of said films, and rigid wiper blades mounted on said shaft between adjacent film-supporting members for distributing and exposing polymer on said facing films so as to avoid bridging between adjacent films.

References Cited

UNITED STATES PATENTS

| | | |
|---|---|---|
| 1,143,743 | 6/1915 | Bauer. |
| 2,240,376 | 4/1941 | Nyquist. |
| 2,869,838 | 1/1959 | Ryder _____ 259—9 |
| 3,248,180 | 4/1966 | Kilpatrick _____ 23—285 |
| 3,253,892 | 5/1966 | Brignac et al. _____ 23—285 |
| 3,279,894 | 10/1966 | Tate et al. _____ 23—285 |
| 3,358,422 | 12/1967 | Van Der Schee ____ 23—285 XR |
| 3,395,746 | 8/1968 | Szabo et al. _____ 159—2 XR |
| 3,411,718 | 11/1968 | Wagner _____ 261—92 XR |
| 3,442,065 | 5/1969 | Foras _____ 159—2 XR |
| 3,447,582 | 6/1969 | Street _____ 159—2 XR |

FOREIGN PATENTS 351,328  6/1931  Great Britain.

MORRIS O. WOLK, Primary Examiner

B. S. RICHMAN, Assistant Examiner

U.S. Cl. X.R.

159—11, 25; 259—9; 260—75, 78; 261—92